(12) United States Patent
Takuma et al.

(10) Patent No.: US 11,200,715 B1
(45) Date of Patent: Dec. 14, 2021

(54) AUTOMATED CREATION AND DESIGN OF PRESENTATION CHARTS

(71) Applicant: International Business Machines Corporation, Armonk, NY (US)

(72) Inventors: Daisuke Takuma, Tokyo (JP); Yoshinori Kabeya, Kawasaki (JP); Emiko Takeuchi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/230,850

(22) Filed: Apr. 14, 2021

(51) Int. Cl.
| | |
|---|---|
| *G06F 17/00* | (2019.01) |
| *G06T 11/20* | (2006.01) |
| *G06T 11/60* | (2006.01) |
| *G06F 40/186* | (2020.01) |
| *G06F 40/20* | (2020.01) |
| *G06F 40/106* | (2020.01) |

(52) U.S. Cl.
CPC .......... *G06T 11/206* (2013.01); *G06F 40/106* (2020.01); *G06F 40/186* (2020.01); *G06F 40/20* (2020.01); *G06T 11/60* (2013.01)

(58) Field of Classification Search
CPC ........ G06T 11/206; G06T 11/60; G06F 40/20; G06F 40/186; G06F 40/106
See application file for complete search history.

(56) References Cited

U.S. PATENT DOCUMENTS

| | | | |
|---|---|---|---|
| 10,180,932 B2 * | 1/2019 | Kyre | G06F 40/177 |
| 10,776,415 B2 * | 9/2020 | Zhao | G06T 11/60 |
| 10,853,566 B2 * | 12/2020 | Kyre | G06F 40/177 |
| 2007/0065013 A1 | 3/2007 | Saund | |
| 2007/0176804 A1 * | 8/2007 | Abe | G06F 40/103 341/84 |
| 2010/0088605 A1 | 4/2010 | Livshin | |
| 2013/0024791 A1 | 1/2013 | Wong | |

(Continued)

OTHER PUBLICATIONS

Gabriela Ferraro, et al., Segmentation of patent claims for improving their readability, Proceedings of the 3rd Workshop on Predicting and Improving Text Readability for Target Reader Populations (PITR) @ EACL 2014, Apr. 2014, pp. 66-73, Gothenburg, Sweden.

(Continued)

*Primary Examiner* — Hassan Mrabi
(74) *Attorney, Agent, or Firm* — Alexander Jochym; Otterstedt, Wallace & Kammer, LLP

(57) ABSTRACT

A method of creating a presentation includes extracting text parts from content, assigning first attributes to the text parts based on the content and design similarities between the text parts, assigning second attributes to the text parts based on processing the text content to extract contextual similarities between the text parts, determining groups of the text parts based on the first and second attributes, determining first links between the text parts of different groups using the display information and adjacencies of the text parts, determining second links of the text parts to object types defined by a graph restriction listing the object types and their parameters, and outputting a presentation by setting the text parts in the presentation corresponding to the parameters of their linked object type in the graph restriction, wherein the text parts of each of the groups are associated with a same one of the object types.

20 Claims, 14 Drawing Sheets

(56) References Cited

U.S. PATENT DOCUMENTS

| | | | |
|---|---|---|---|
| 2017/0004124 A1* | 1/2017 | Kyre | G06F 40/205 |
| 2017/0075877 A1 | 3/2017 | Lepeltier | |
| 2017/0178369 A1 | 6/2017 | Nelson | |
| 2019/0034399 A1* | 1/2019 | Kyre | G06F 40/205 |
| 2021/0012064 A1* | 1/2021 | Nakayama | G10L 15/22 |
| 2021/0174010 A1* | 6/2021 | Kyre | G06F 40/186 |

OTHER PUBLICATIONS

Bogdan-Lyashenko, CodeCrumbs, https://github.com/Bogdan-Lyashenko/codecrumbs/blob/master/README.md. May 2020, pp. 1-9.

Masayuki Okamoto, Applying Information Extraction for Patent Structure Analysis, Conference: The 40th International ACM SIGIR Conference on Research and Development in Information Retrieval (SIGIR 2017), Aug. 2017, pp. 1-4.

Takao Matsui, "Claim Format and Claim Sets (Chapter V.B and C)" Sep. 2015, pp. 1-61.

* cited by examiner

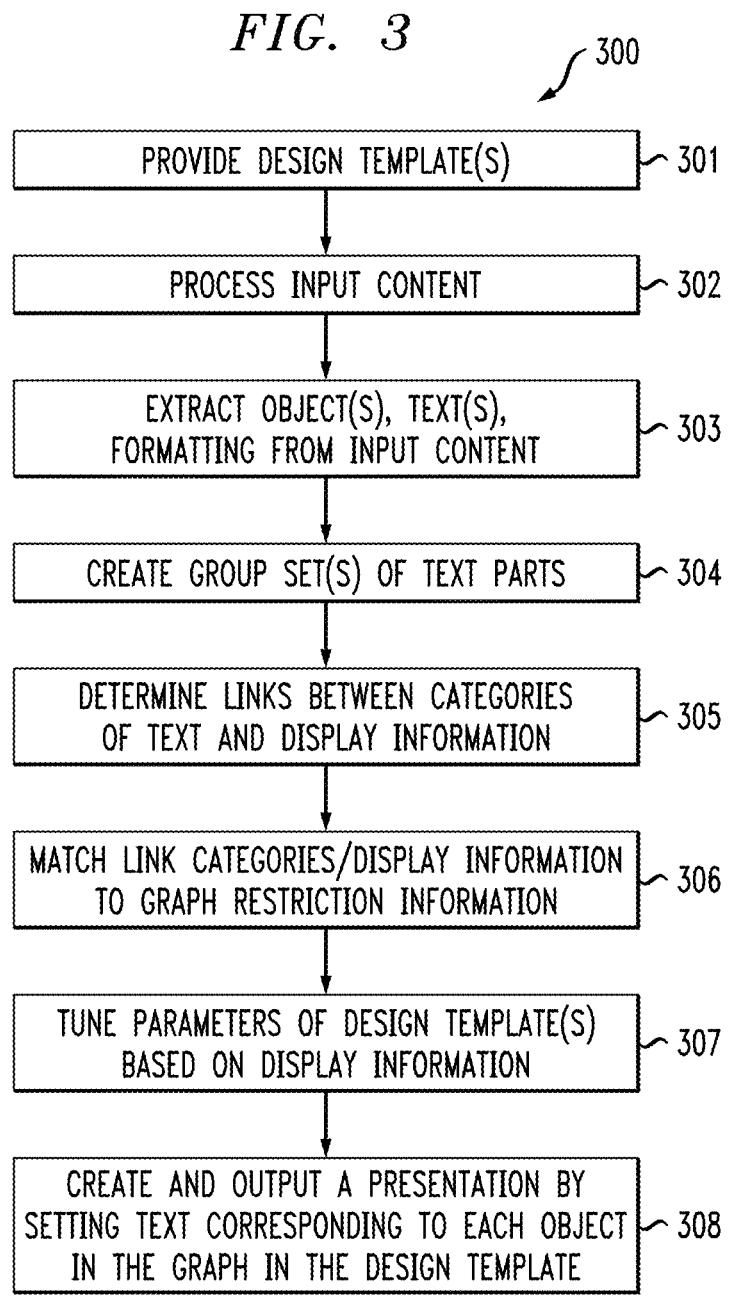

FIG. 4
GRAPH RESTRICTION INFORMATION

401 — "TWO-LAYER TREE" TEMPLATE

| OBJECT TYPE | TEXT RESTRICTION | LINK TARGET | NO. OF LINKS | RESTRICTED NO. OF NODES |
|---|---|---|---|---|
| ROOT | | TOP | MULTIPLE | 1 |
| TOP | NOT NULL | ROOT | 1 | MULTIPLE |
| | | SUB | 0...MULTIPLE | |
| SUB | NOT NULL | TOP | 1 | 1...MULTIPLE |

402 — "CYCLE" TEMPLATE

| OBJECT TYPE | TEXT RESTRICTION | LINK TARGET | NO. OF LINKS | RESTRICTED NO. OF NODES |
|---|---|---|---|---|
| ROOT | | TOP | MULTIPLE | 1 |
| STATE | NOT NULL | ROOT | 1 | MULTIPLE |
| | | PROCESS | 0 OR 1 | |
| PROCESS | NULLABLE | STATE | 1 | 0 OR 1 |

403 — EXAMPLE OF GRAPH SATISFYING GRAPH RESTRICTION

EXAMPLE OF OUTPUT AFTER APPLICATION OF DESIGN TEMPLATE

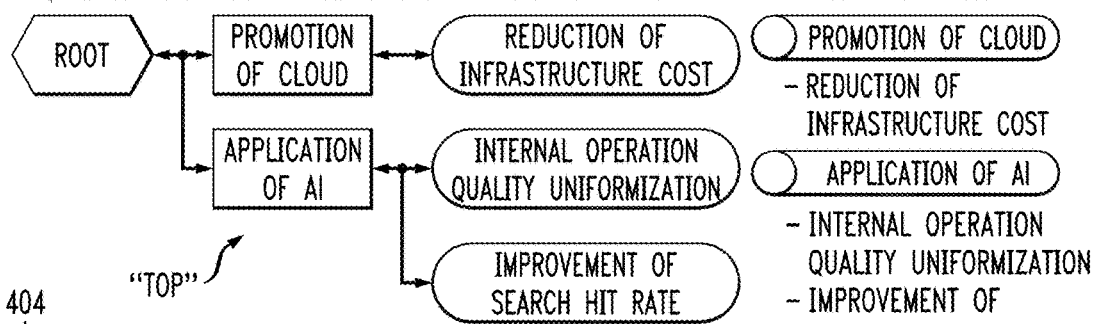

"TOP" / "SUB"

404 /  405 / 406

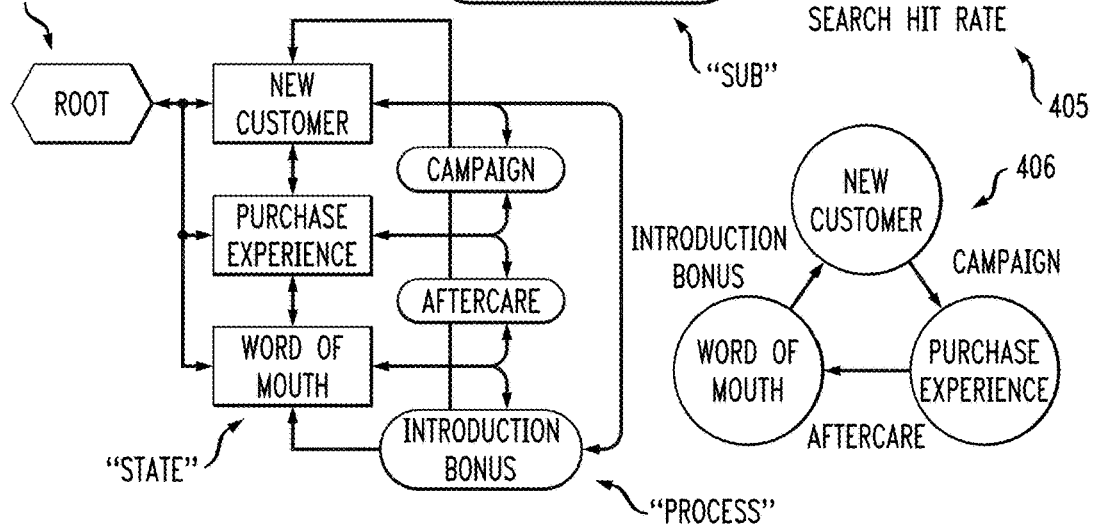

"STATE" / "PROCESS"

INTRODUCTION BONUS / CAMPAIGN / AFTERCARE

- PROMOTION OF CLOUD
  - REDUCTION OF INFRASTRUCTURE COST
- APPLICATION OF AI
  - INTERNAL OPERATION QUALITY UNIFORMIZATION
  - IMPROVEMENT OF SEARCH HIT RATE

--- <PAGE BREAK> ---

- CASE EXAMPLES
  - A PHARMACEUTICAL COMPANY
  - B BANK
  - C DAMAGE INSURANCE

501

```
Main
line=0
For each top in Root.link["Top"] { } //Top-type node at link
    If (line + CountLines(top) > Maximum lines} Output page break line = 0 }
    Output Top-type object with its text set to top.text in the position of line x line height from the top
    line++
    For each sub in top.link["Sub"] { }
        Output Bullet and sub.text in the position of line x line height from the top
        line++
    ~~
~~
// Count lines outputted below a top
CountLines(Top top)
count = 1; //
For each sub in top.link["Sub"]
    count += The number of lines for the output of sub
~~
```

FIG. 9

DESIGN TEMPLATE (X)
GRAPH: 1 NODE TYPE + 1 COMMENT BALLOON — 901

| OBJECT TYPE | TEXT RESTRICTION | LINK TARGET | NO. OF LINKS | RESTRICTED NO. OF NODES |
|---|---|---|---|---|
| ROOT | | NODE_A | MULTIPLE | 1 |
| NODE_A | NOT NULL | ROOT | 1 | 1...MULTIPLE |
| | | NODE_A | 1...MULTIPLE | |
| COMMENT | NOT NULL | NODE_A | 1 | 0...MULTIPLE |

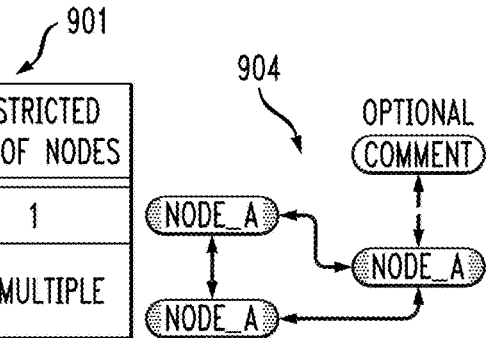

DESIGN TEMPLATE (Y)
GRAPH: 2 NODE TYPES + 1 COMMENT BALLOON — 902

| OBJECT TYPE | TEXT RESTRICTION | LINK TARGET | NO. OF LINKS | RESTRICTED NO. OF NODES |
|---|---|---|---|---|
| ROOT | | NODE_A | MULTIPLE | 1 |
| NODE_A | NOT NULL | ROOT | 1 | 1...MULTIPLE |
| | | NODE_A | 0...MULTIPLE | |
| | | NODE_B | 0...MULTIPLE | |
| NODE_B | NOT NULL | NODE_A | 0...MULTIPLE | 1...MULTIPLE |
| | | NODE_B | 0...MULTIPLE | |
| COMMENT | NOT NULL | NODE_A | 1 | 0...MULTIPLE |

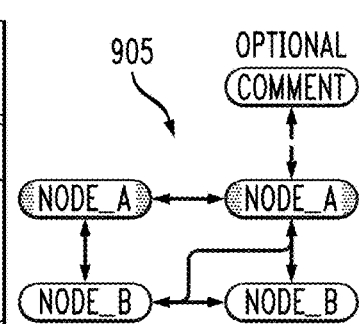

DESIGN TEMPLATE (Z)
GRAPH: 2 NODE TYPES + 1 COMMENT BALLOON
(MAXIMUM 2 NODES) — 903

| OBJECT TYPE | TEXT RESTRICTION | LINK TARGET | NO. OF LINKS | RESTRICTED NO. OF NODES |
|---|---|---|---|---|
| ROOT | | NODE_A | MULTIPLE | 1 |
| NODE_A | NOT NULL | ROOT | 1 | 1...MULTIPLE |
| | | NODE_A | 0...MULTIPLE | |
| | | NODE_B | 0...MULTIPLE | |
| NODE_B | NOT NULL | NODE_A | 0...MULTIPLE | 1...MULTIPLE |
| | | NODE_B | 0...MULTIPLE | |
| COMMENT | NOT NULL | NODE_A | 1 | 0...2 |

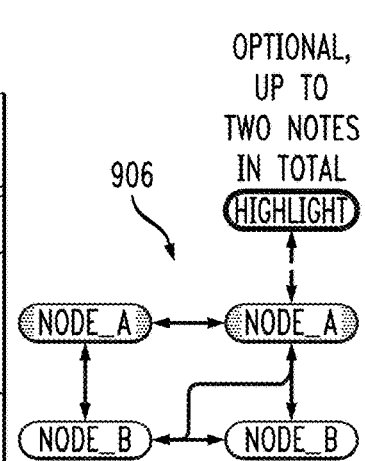

*FIG. 16*
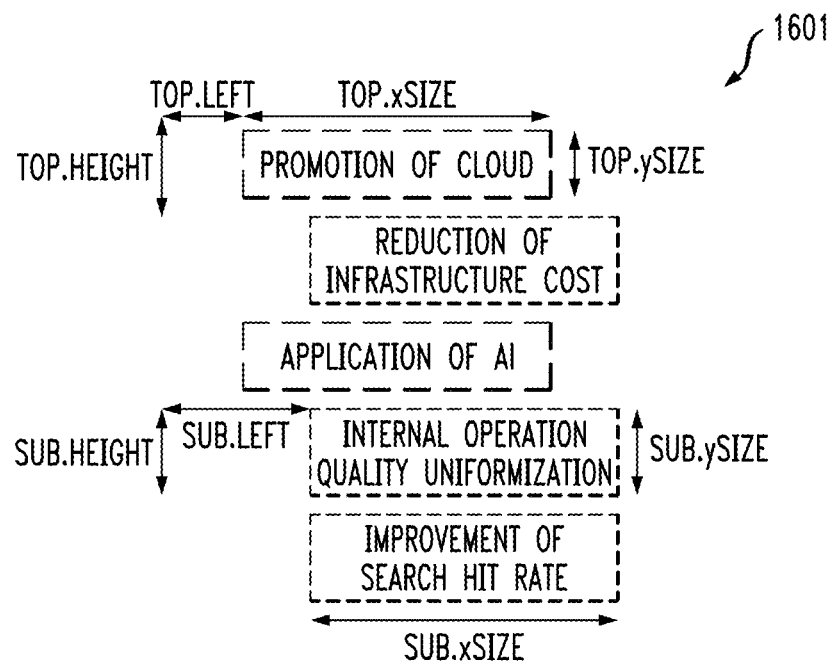
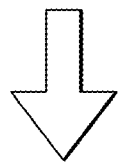
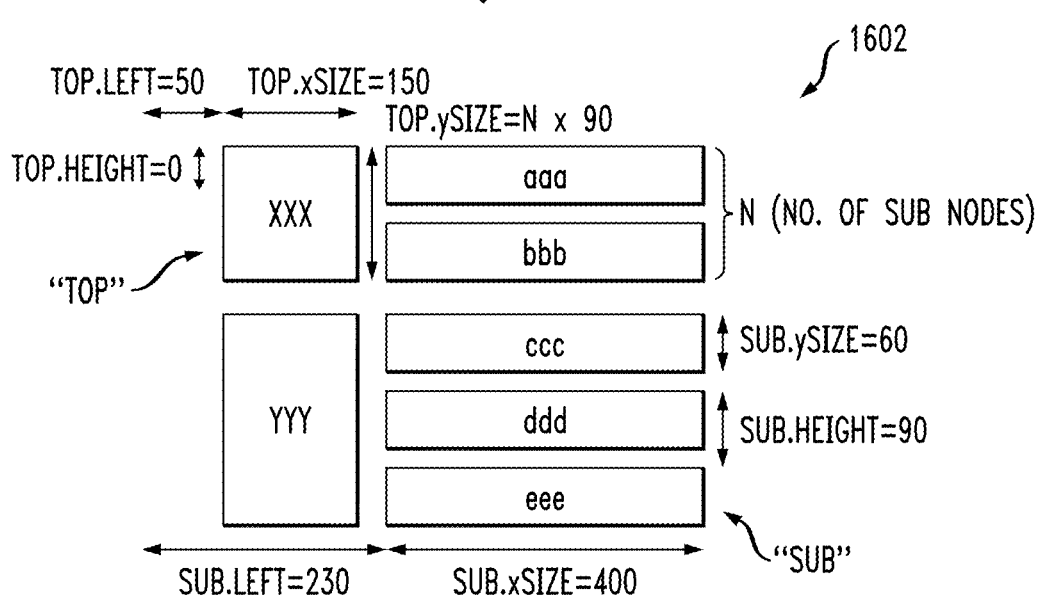

AUTOMATED CREATION AND DESIGN OF PRESENTATION CHARTS

BACKGROUND

The present disclosure relates generally to a computer processes, and more particularly to methods for creating and designing presentation charts.

Although visual presentation material represents an efficient means of communication, development of the material requires a significant temporal cost. Furthermore, the result depends on individual skill and taste to create material reflecting a logical structure of information to be delivered.

SUMMARY

According to an embodiment of the present invention, a computer-implemented method of operating a computer system for creation of a shaped presentation data comprises receiving text content comprising display information; extracting a plurality of text parts from the text content and the display information into; assigning first attributes to each of the text parts based on the display information and design similarities between the text parts; assigning second attributes to each of the text parts based on the display information and design similarities between the text parts; determining a plurality of groups of the text parts based on the first attributes and the second attributes; determining first links between the text parts of different ones of the groups using the display information, adjacency of the text parts in the text content, and adjacency of the groups in the text content; determining second links of the text parts to a plurality of object types defined by a graph restriction listing the object types and their parameters; and outputting a presentation by setting the text parts in the presentation corresponding to the parameters of their linked object type in the graph restriction, wherein the text parts of each of the groups are associated with a same one of the object types.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

BRIEF DESCRIPTION OF THE DRAWINGS

Preferred embodiments of the present invention will be described below in more detail, with reference to the accompanying drawings:

FIG. 3 is a flow diagram illustrating a method for creating a presentation according to embodiments of the present invention;

FIG. 4 is a depiction of a graph restriction information, generated graphs, and created presentations according to some embodiments of the present invention;

FIG. 5 illustrates pseudo code of a design template according to some embodiments of the present invention;

FIG. 9 is a depiction of three design templates, each with graph restriction information, and generalized output graphs according to some embodiments of the present invention;

FIG. 16 illustrates an extraction of parameters from an input content according to embodiments of the present invention.

DETAILED DESCRIPTION

Figure 1:
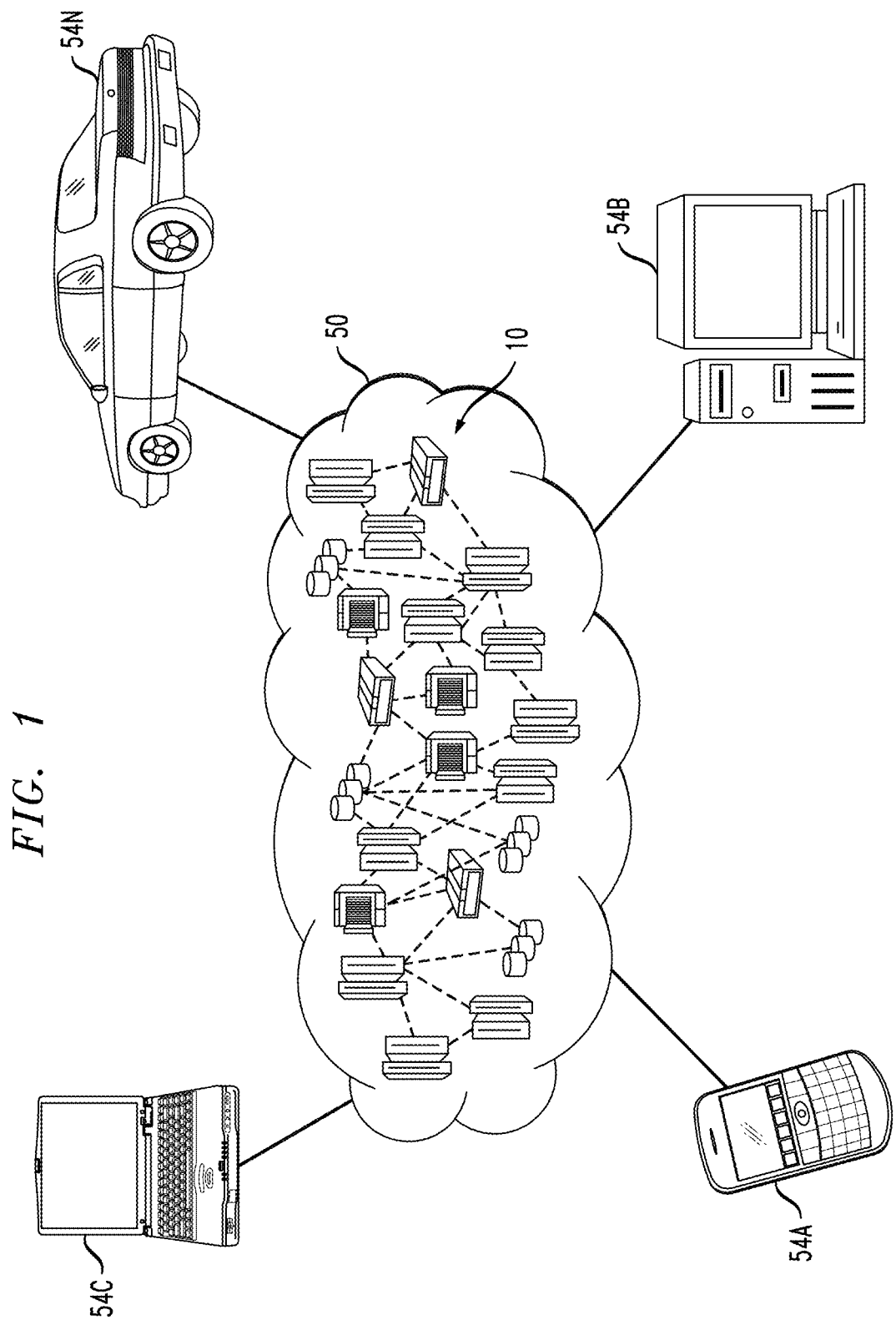
FIG. 1 depicts a cloud computing environment according to an embodiment of the present invention.

Embodiments of the present invention are directed to methods and tools for creating shaped presentation data. According to some embodiments, the methods and tools take content as input, where a logical structure of the content is extracted from plain text or initial presentation type data of the content. The extracted logical structure comprises objects; these extracted objects are unrestricted, where no objects are not placed in a template (e.g., a top-down template on a page basis, etc.).

Some embodiments of the present invention enable a reformatted visualization of the extracted logical structures in original content, such as a hierarchical or tabular view, disconnected from any design of the original content. For example, objects representing semantically different concepts such as "data," "processing," "method," and "effect" are visually distinguished by the tool in a process of creating a presentation.

Techniques of the present invention can provide substantial beneficial technical effects. For example, one or more embodiments may provide for:

creating a logical structure of a presentation given document based information.

These and other features and advantages of the present invention will become apparent from the following detailed description of illustrative embodiments thereof, which is to be read in connection with the accompanying drawings.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
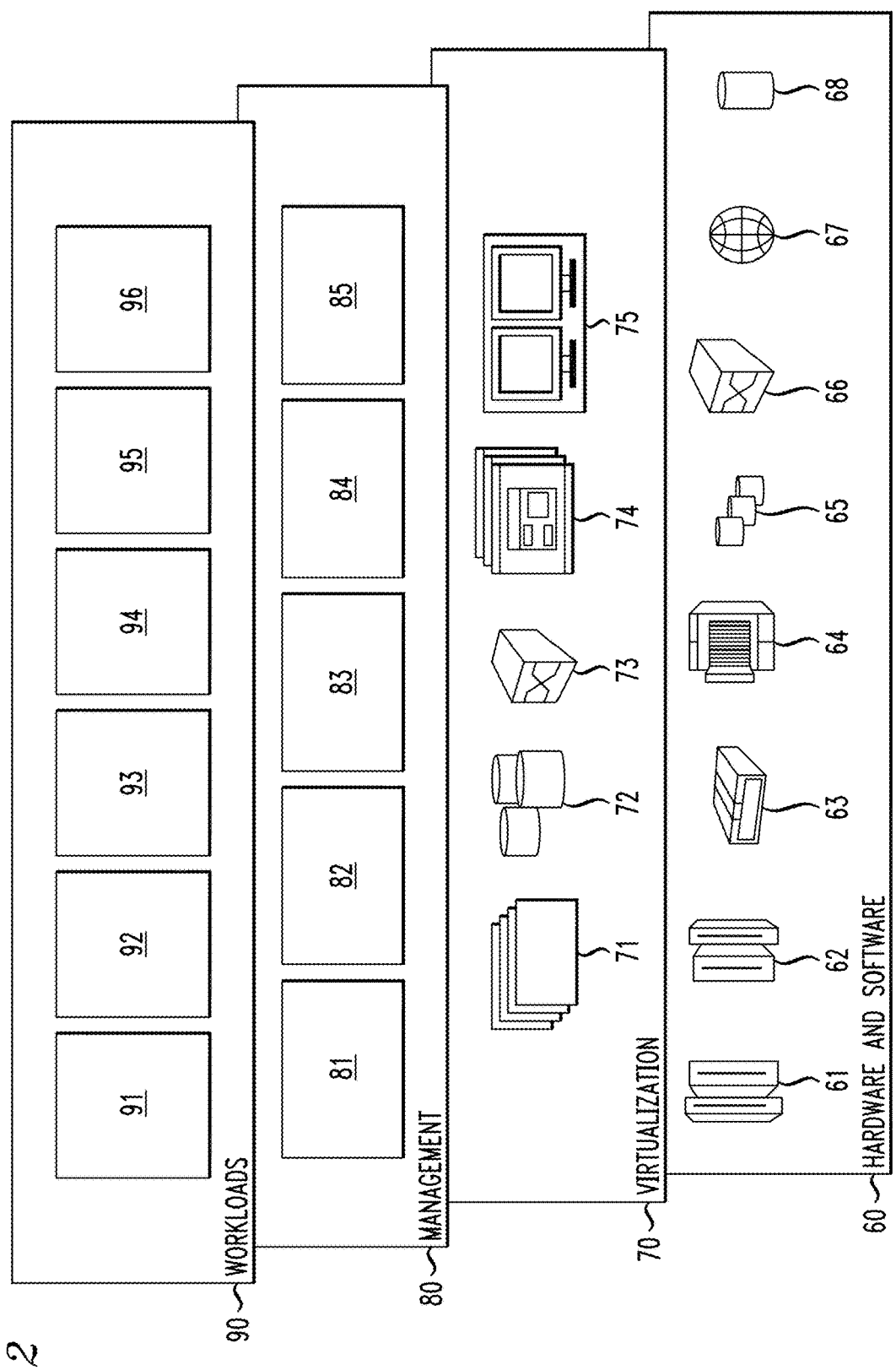
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and creating shaped presentation data 96.

According to some embodiments and referring to FIG. 3, a method of generating a structured document includes providing one or more design templates 301. The design templates comprise graph restriction information. The graph restriction information is a tool used in processing input content 302, also referred to as a corpus. The graph restriction information can be embodied as a table listing internal information including object type, text restriction, link target, number of links, and a restricted number of nodes.

According to some embodiments, the design template is a program (or configuration parameters for a program), which converts the input content 303, and in particular, portions of the corpus satisfying the graph restriction information, into output objects and texts for use in generating the structured document. According to some embodiments, the conversion of the input content 303 includes determination of formatting information, such as page break information. For example, the page break information is a mechanism of inserting page breaks in the structured document.

According to some embodiments, the graph restriction information can be embodied as a two-layer tree template 401 or a cycle template 402 (see FIG. 4). Example graphs 403 and 404 satisfying the graph restriction information 401 and 402, respectively, are shown. Note that the object type is demarked by shape, with the root object corresponding to a hexagon, the top object corresponding to rectangle, and the sub object corresponding to the rounded rectangle. Furthermore, example portions of output presentations 405 and 406 are shown, corresponding to the graphs 403 and 404, respectively.

The two-layer tree template 401, which is a design template, as pseudo code 501 (see FIG. 5). A portion of output presentation 405 is shown with correspondence to snippets of the pseudo code 501 of the design template.

According to at least one embodiment, the graph restriction information is configured to insert a page break into the presentation based on a relevance of output information contents. The design template can includes instructions (i.e., code) for a process to split the output into segments to fit to a page size of the chart. For example, in the pseudo code 501, the line "If (line+CountLines(top)>Maximum lines" generates a page break in the output presentation.

According to some embodiments, if the design template includes a loop process, the loop process can include (e.g., be split into) sub-loops, so that each sub-loop generates objects formatted for, or to be displayed on, a respective page. For example, if the design template generates a hierarchical list of bullets on some output page of a presentation, the process (of the design template) can assign a score for a likelihood of a boundary between each pair of bullets and determine the positions of page breaks based on these scores. According to some embodiments, the scores are large (increase) when, for example, the boundary is located before a top-level bullet, the size of the content is close to the limit of the page, or the content between the bullets are different.

According to some embodiments, and referring again to FIG. 3, display information and text information of the input content are processed to identifying one or more group sets or categories of the text in the input content 304. According to at least one embodiment, several candidates of group sets can be output at 304.

Figure 6:
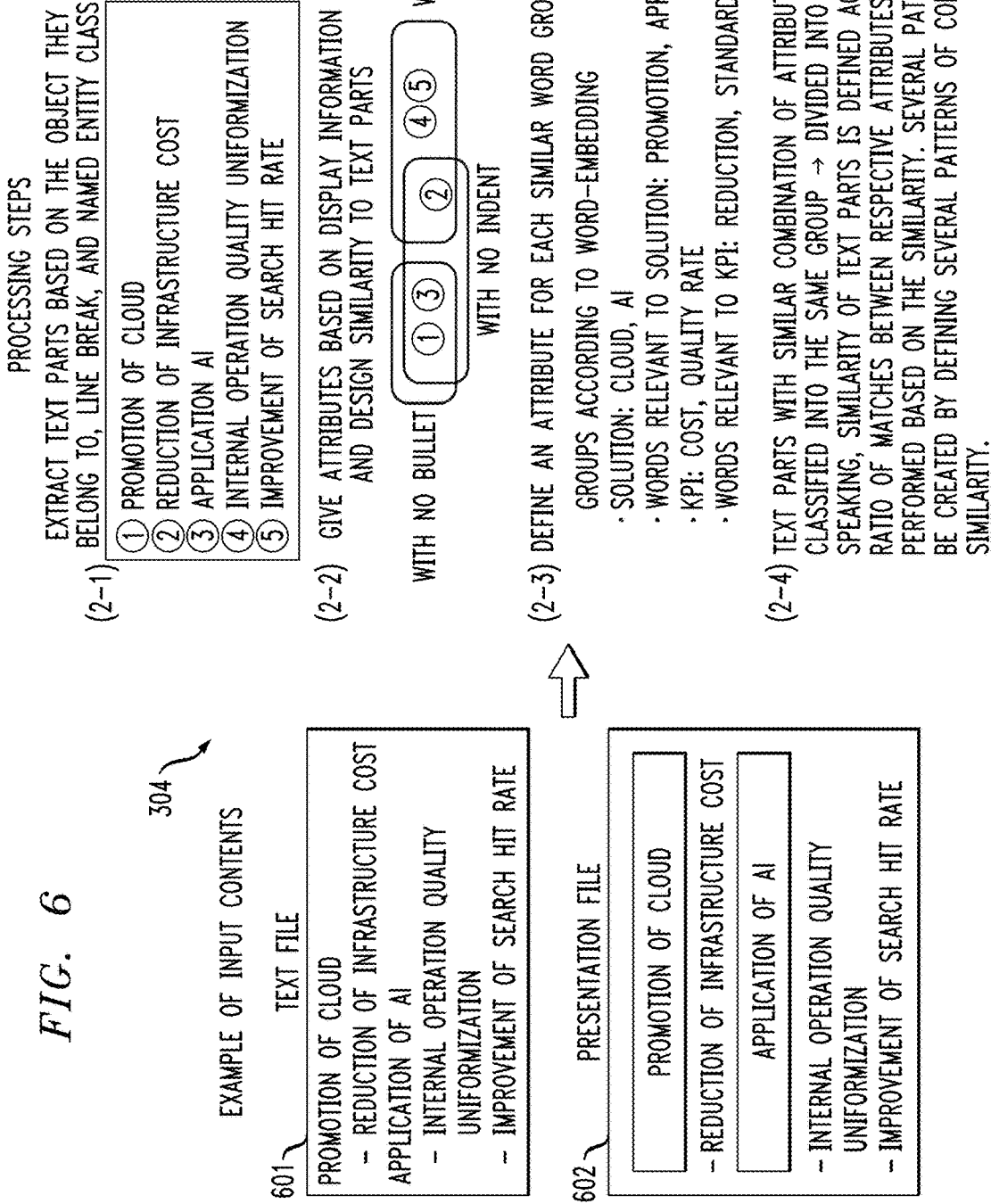
FIG. 6 illustrates a method for identifying one or more groups sets or categories of the text in the input content according to an embodiment of the present invention.

More particularly, at block 304, a text file 601 of the input content and a presentation file 602 are received as input (see FIG. 6). Text parts can be extracted based on the object they belong to, line break, and entity class (2-1). As can be seen in at (2-1), the extracted text parts are labeled as 1-5. First attributes are assigned to the text parts based on display information and design similarity at (2-2). For example, the text parts are assigned attributes selected from the group of "with no bullet" (including text parts 1, 3), "with bullet" (including text parts 2, 4, 5) and "with no indent" (including text parts 1, 2, 3).

At (2-3), the method includes defining second attributes determined based on similarities between the text parts. The second attributes indicate similarities between the text parts. More particularly, word groups are extracted from the text content using a word-embedding method, where the words are represented for text analysis (e.g., as a vector value in a vector space where words with a similar meaning are relatively close). Similar word groups are then assigned to similar ones of the text parts, again based the word-embedding. For example, the word groups "Solution: cloud, AI" and "Words relevant to solution: promotion, application" are assigned to text parts 1 and 3, and the word groups "KPI: cost, quality, rate" and "Words relevant to KPI: reduction, standardization, improvement" are assigned to text parts 2, 4, and 5.

According to some embodiments, text parts with a similar combination of the first and second attributes in (2-2) and (2-3) are classified into the same group at (2-4) (e.g., divide into a first group comprising text parts 1 and 3, and a second group comprising text parts 2, 4, 5). At (2-4), the similarity of text parts is determined according to a number or ratio of matches between respective attributes. The text parts are clustered using the similarity.

According to some embodiments, the classification of the text parts can be configured by the contribution of the first and second attributes. For example, given weights 1.0 and 2.0 set for the similarity based on display information (2-2) and the similarity based on word sense similarity (2-3), respectively, an emphasis is placed on the word sense similarity by virtue of the larger weight. In some cases, this configuration of weights works well when the format of the input is inconsistent or noisy. Configured oppositely, with weights 2.0 and 1.0, the system is configured for a case where the format of the input is consistent or when the textual information is not effective for some reason, such as the presence of a large number of technical terms.

According to some embodiments, links are determined between the categories of text and the display information 305. Links between text parts pertain to the different groups, i.e., the first group of text parts and the second group of text parts, determined at block 304 and the display information.

According to some embodiments, the display information is explicitly defined for the input content, e.g., as metadata of the input data. According to at least one embodiment, the display information is extracted from the input content, e.g., by detecting font, font size, object parameters found in the input content, etc.

Figure 7:
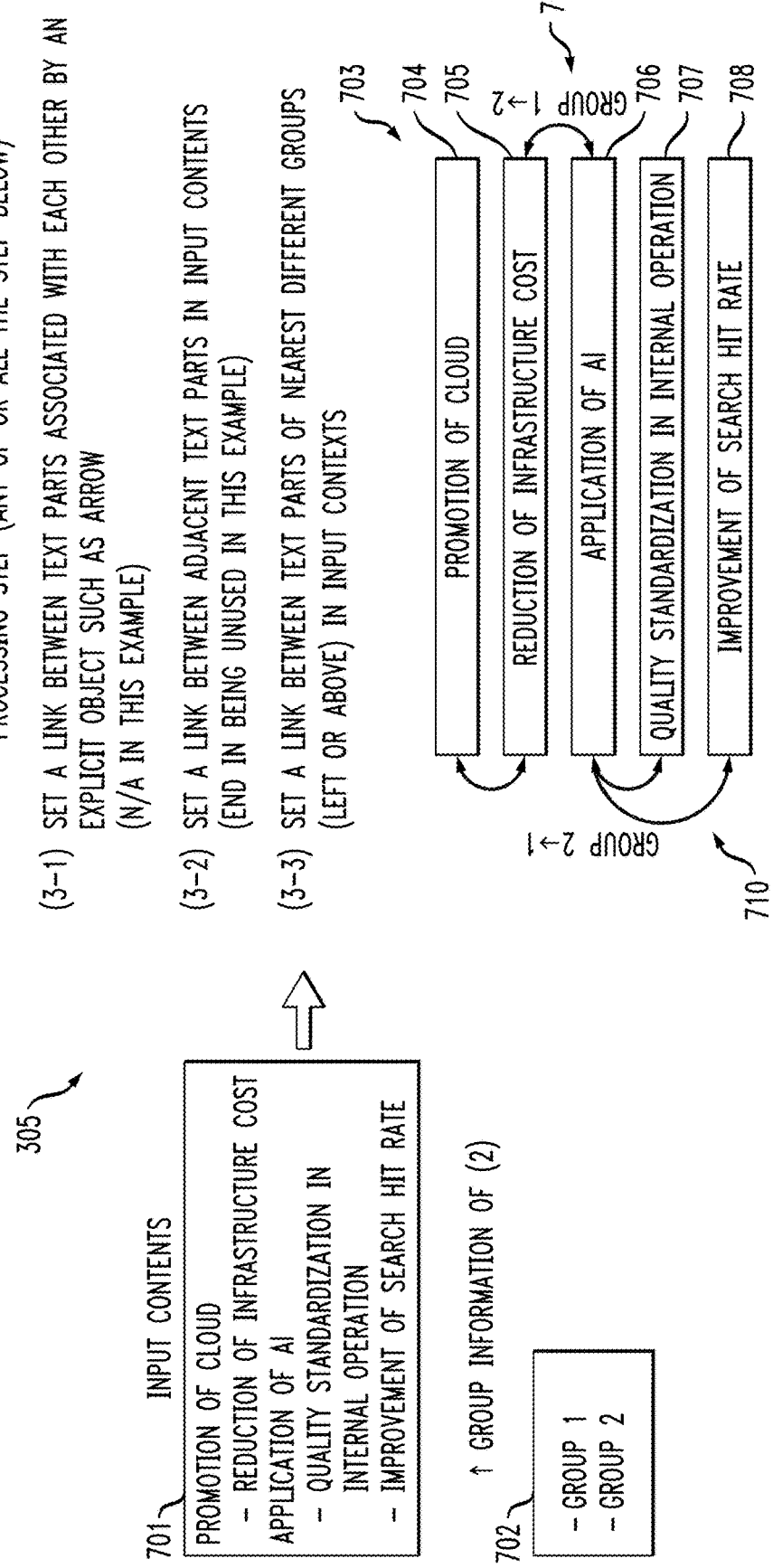
FIG. 7 illustrates a method for determining links between the categories of text and the display information according to an embodiment of the present invention.

At 305 and referring to FIG. 7, given the input contents 701 and the group information 702, the links can be determined by one or more methods. It should be understood that group 1 includes the top object text parts "Promotion of cloud" and "Application of AI," and group 2 includes the sub object text parts "Reduction of infrastructure cost," "Quality standardization in internal operation," and "Improvement of search hit rate." According to some embodiments, the determination of links can include the setting of a link between text parts associated with each other by an explicit object such as an arrow (3-1), the setting of a link between adjacent text parts in the input content (3-2), and the setting of a link between text parts of nearest different groups (left or above) in the input contents (3-3).

According to some embodiments, the determination of links between the categories of text and the display information is illustrated at 703, where text parts 704-708 are linked. The link 709 shows a link from a group 1 text part (i.e., "application of AI" 706) to a group 2 text part ("reduction of infrastructure cost" 705), and the links 710 from group 2 text parts to group 1 text parts (i.e., from 705 to 704, from 707 to 706, and from 708 to 706).

Figure 8:
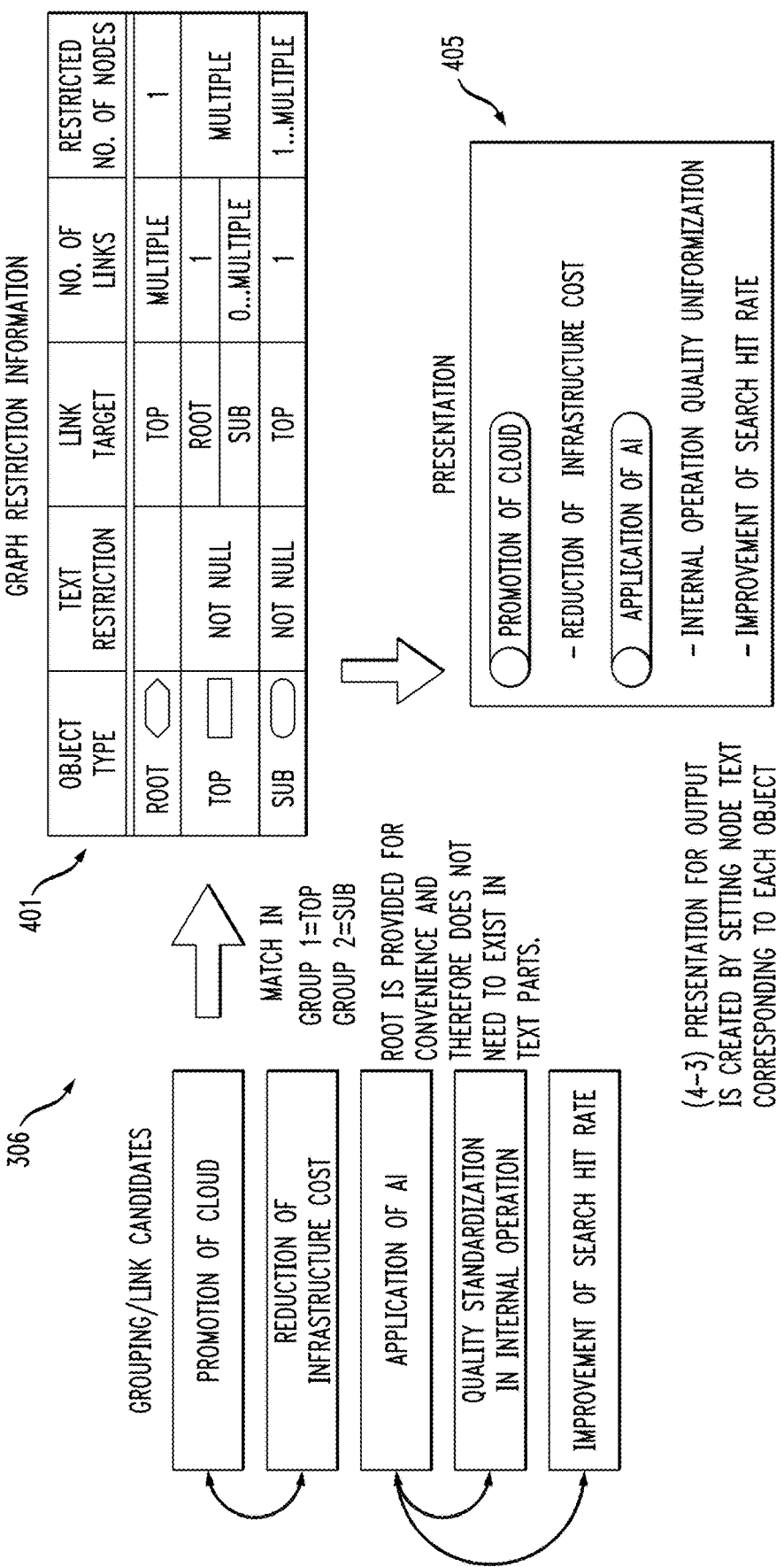
FIG. 8 illustrates a method matching combinations of groups and links to a graph restriction information of design template according to an embodiment of the present invention.
Figure 10:
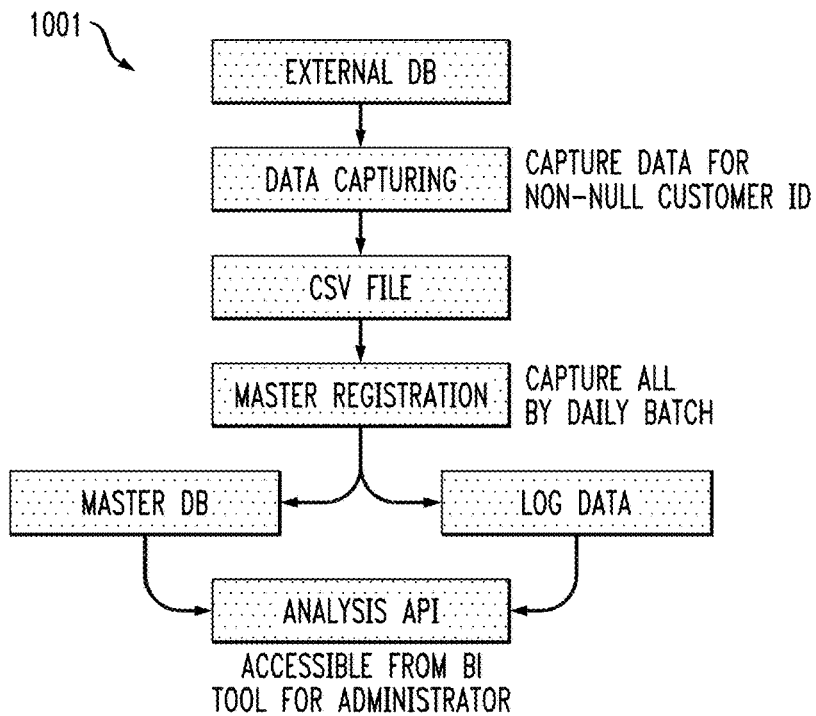
FIG. 10 illustrates example input content according to an embodiment of the present invention.
Figure 11:
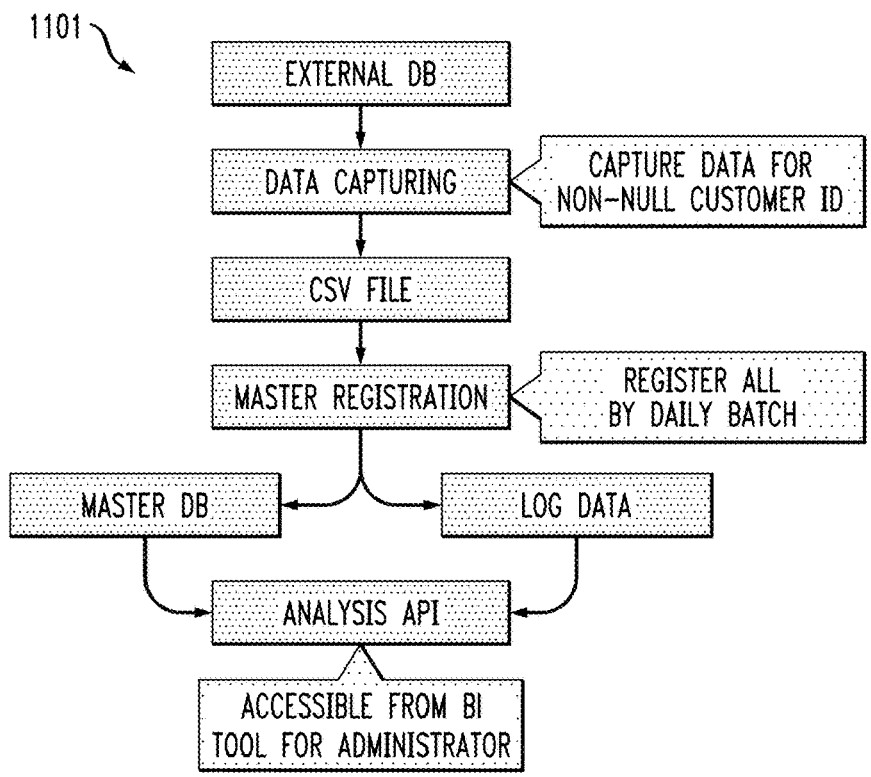
FIGS. 11-13 are examples of output presentation pages, corresponding to the three design templates according to some embodiments of the present invention.
Figure 12:
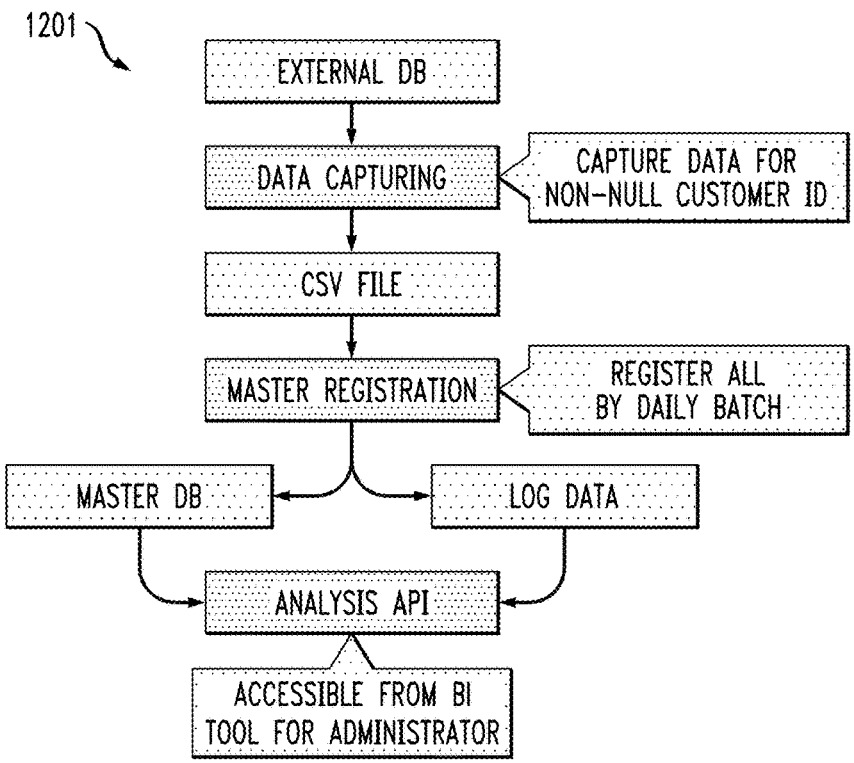

According to some embodiments, linked ones of the categories of text and the display information are matched to the graph restriction information 306 (see also FIG. 8). At block 306, the combinations of groups determined at 304 and the links determined at 305 are matched to the graph restriction information of design template prepared at block 303. According to some embodiments, the matching 306 includes matching text in a same group (determined at 304) as the same object type in the graph (see FIG. 4), matching links determined at 305 to the graph links, and a presentation is created/output 308 by setting the node text corresponding to each object in the graph (e.g., 401) in a design template 801.

According to some embodiments, the process of matching links 306 includes checking that the links between every pair of object-types satisfy the restriction of "link target" and "No. of links" in the design template, e.g., 401. For example, assume the object types "Top" and "Sub" in the design template 401 are respectively group 1 and group 2. The process of matching links 305 determines that the restrictions of the design template 401 are satisfied, where the number of links from each text part in group 1 (i.e., text parts 704 and 706) has no restriction in the design template (i.e., 0 . . . multiple), and the text parts in group 2 (i.e., text parts 705, 707, 708) have one link to a text part in group 1, which satisfies the "No. of links" restriction in the design template of having exactly one link for each. In an alternate example, if the object types "Top" and "Sub" in the design template 401 are respectively group 2 and group 1, then text part 706 in group 1 (Sub) does not satisfy the "No. of links" restriction of the design template, since it has two links to text parts in group 2 (Top).

According to at least one embodiment, in a case where the input content includes display information (or display information is extracted from the input content), the method includes tuning the parameters of the design template 307. For example, the tuned parameters can include object sizes, colors, shapes (e.g., roundness of rounded rectangles), or positions. According to some embodiments, the parameters are tuned so that the objects defined by the template approach (e.g., are most close to) parameters extracted from the input content's display information. For example, for a template with parameters defining a line height and collections of colors for objects (described in detail below), and given the input content/text with display information, the line height of the template (defined by the template) is tuned to a size of the output close to that of the input presentation (e.g., but confined by a range set in the template), and a best collection of colors is chosen (from the collections defined by the template) to configure the overall colors of the output presentation similar to the input, while the quality of the combination of colors is guaranteed by the template.

Referring to the template with parameters defining collections of colors for objects, an example template has two collections of colors for its object types as follows:

Collection 1:

| | | |
|---|---|---|
| OBJECT_TYPE_1 beige: | #f0d0b0 | (50%) |
| OBJECT_TYPE_2 light blue 1: | #c0e0e8 | (40%) |
| OBJECT_TYPE_3 orange: | #f8a040 | (10%) |

Collection 2:

| OBJECT_TYPE_1 Green: | #b0e870 | (50%) |
| --- | --- | --- |
| OBJECT_TYPE_2 Black: | #101010 | (40%) |
| OBJECT_TYPE_3 Light gray: | #d0d0d0 | (10%) | where 0xRRGGBB is a hexadecimal representation of the brightness of red (RR), green (GG), and blue (BB), ranging from 0 (00) to 255 (FF), and the area ratio specified for each color denoted by "(XX %)".

In the case where an input chart has four objects with respective colors as follows:

| OBJECT_A_yellow 1: | #f8f0b0 | (25%) |
| --- | --- | --- |
| OBJECT_B_yellow 2: | #f8f0c0 | (20%) |
| OBJECT_C_light blue 2: | #c0c8e0 | (45%) |
| OBJECT_D_strong orange: | #ff6010 | (10%) | a mapping between objects in the input chart and the object types in the templates is created according to the block 306 as follows:

OBJECT_A→OBJECT_TYPE_1
OBJECT_B→OBJECT_TYPE_1
OBJECT_C→OBJECT_TYPE_2
OBJECT_D→OBJECT_TYPE_3

Continuing at block 307, a color collection matching the color balance of the input chart is selected. According to some embodiments, the method of color collection matching includes computing an average color and a total area ratio of each object type as follows:

OBJECT_TYPE_1: #f8f0c8 (45%=25%+20%)
OBJECT_TYPE_2 light blue 2: #c0c8e0 (45%)
OBJECT_TYPE_3 strong orange: #ff6010 (10%).

As an example, OBJECT_TYPE_1 is computed as an average of yellow 1 and yellow 2 (i.e., an average of #f8f0b0 and #f8f0c0 is #f8f0c8).

According to some embodiments, the method includes computing a matching cost of each color collection to the input (e.g., where smaller is better). For example, the matching cost is defined for each object type by:

$$\alpha(|R\_temp-R\_input|^p+|G\_temp-G\_input|^p+|B\_temp-B\_input|^p)+\beta|AREA\_temp-AREA\_input|$$

where
R_temp, G_temp, B_temp: gives the brightness of red, green, and blue, respectively, in the template;
R_input, G_input, B_input: gives the brightness of red, green, and blue, respectively in the input;
AREA_temp, AREA_input: gives the area ratio in the template and the input, respectively; and
p, $\alpha$, $\beta$: are the parameters (p=1, $\alpha$=0.1, $\beta$=1 for example).

According to some embodiments, the total matching cost is computed as the mixture of the cost for each object type such as sum. In this example, Collection 1 has a smaller cost than Collection 2, and therefore Collection 1 is applied to the output.

Figure 13:
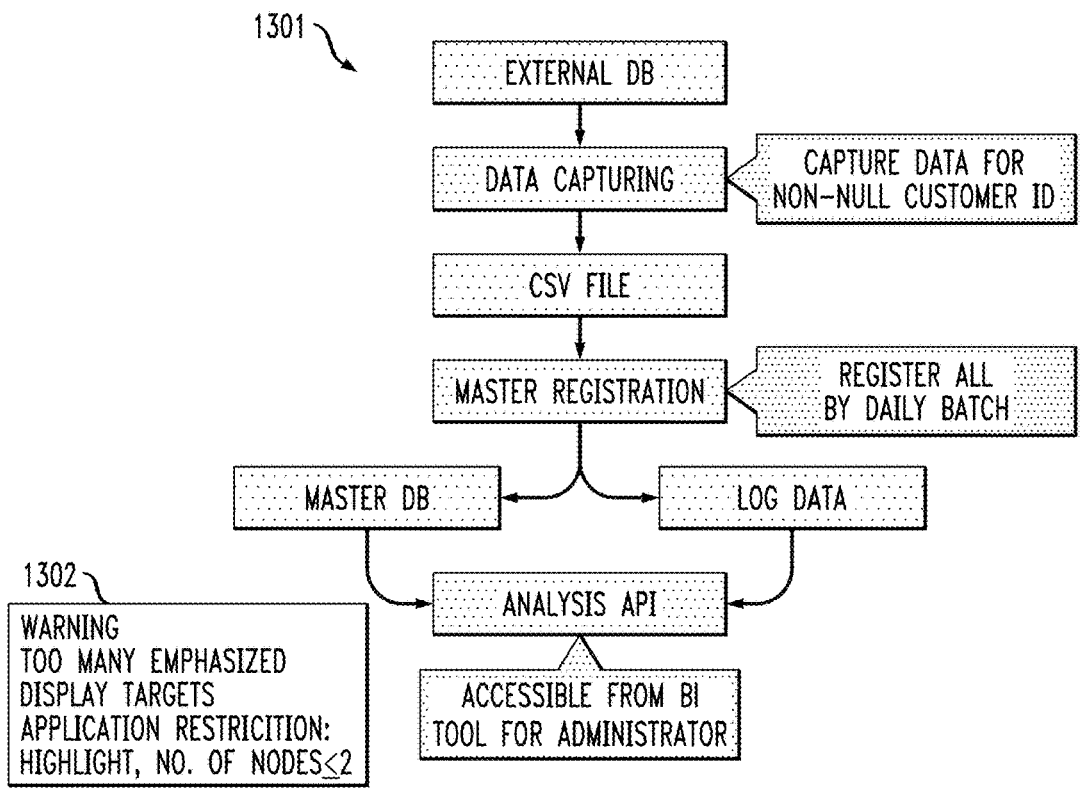

Referring now to FIGS. 9-13 and an illustrative example where multiple candidate templates are considered according to one or more embodiments, given three design templates X 901, Y 902, Z 903 (FIG. 9, respectively) and input content 1001 (FIG. 10), three candidate representations 1101, 1201, and 1301 (FIGS. 11-13) generated using the respective design templates (901-903). The generated candidate representation satisfy the node-type and link restrictions of the respective design templates using differently formatted objects (e.g., the connections between nodes, the color of different groups of nodes, the depiction of balloons, etc.). Further, the design templates 901-903 are illustrated by graphs 904-906, respectively. According to some embodiments, a user chooses a candidate from among 1101, 1201, and 1301. According to at least one embodiments, the system outputs an alert 1302 corresponding to candidate 1301 upon determining that the candidate does not satisfy a node count restriction. As shown in FIG. 13, the alert can be a graphic displayed on the candidate representation.

Figure 14:
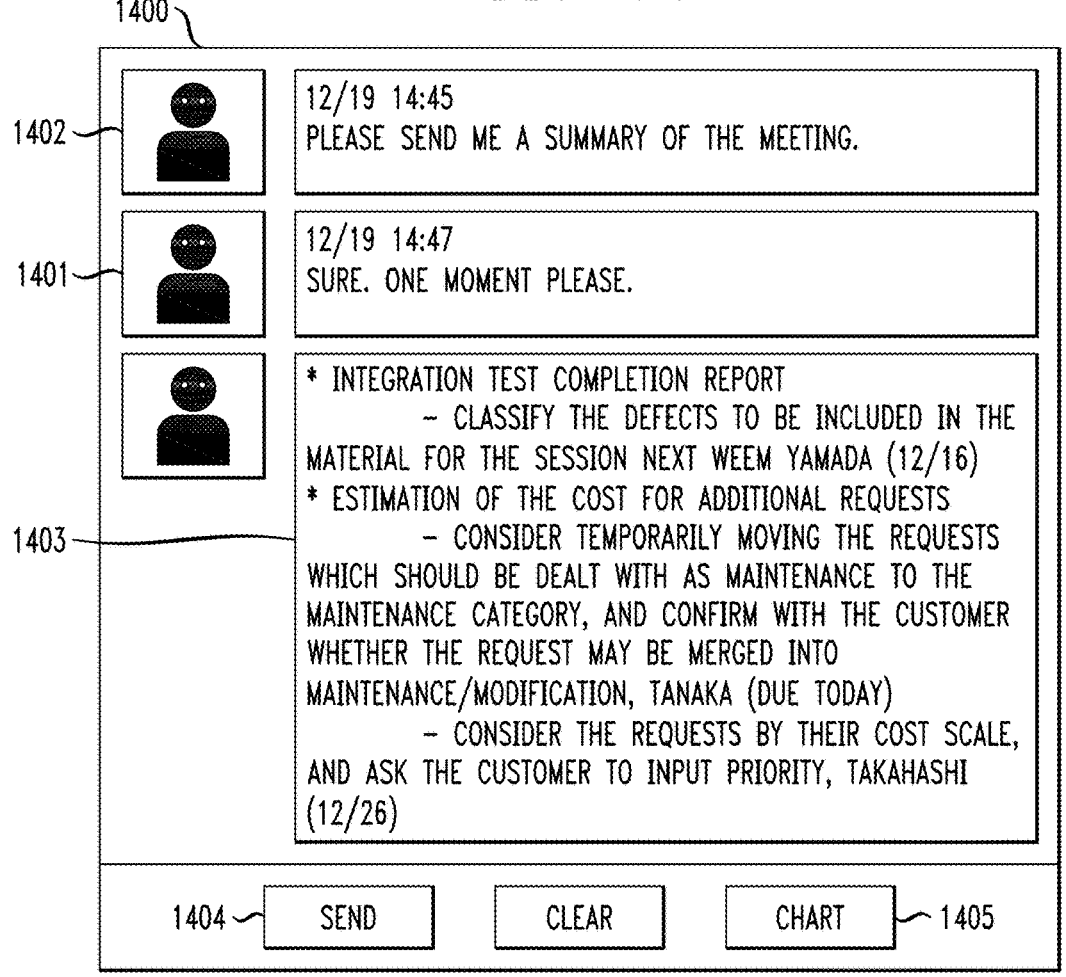
FIG. 14 depicts a view of a user-interface for a chat application with a charting function according to some embodiments of the present invention.
Figure 15:
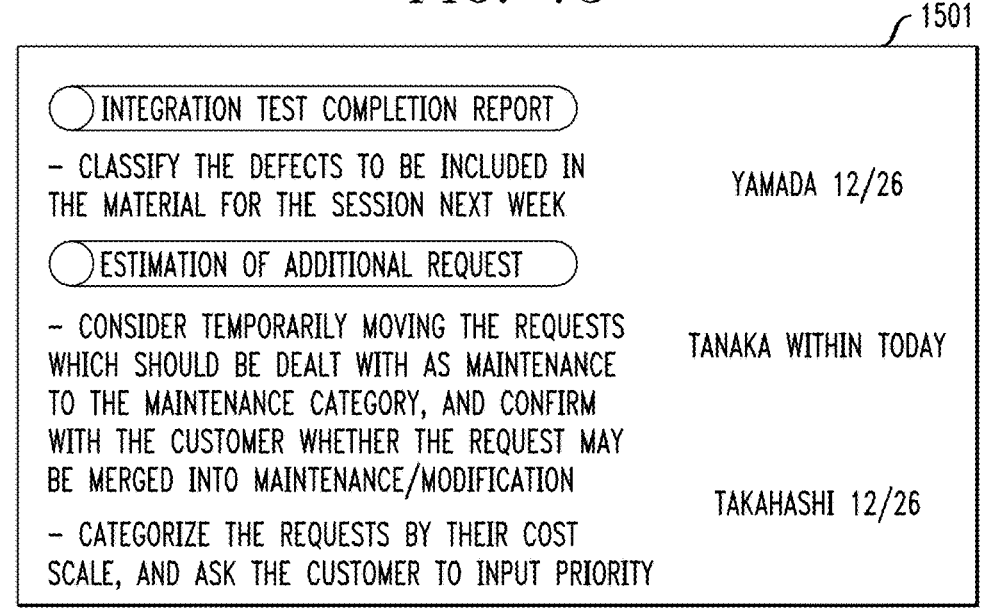
FIG. 15 depicts a communication generated and shared by the chat application of FIG. 14.

According to at least one embodiment, FIG. 14 depicts a view of a user-interface of a chat application 1400 running on a device of a first user 1401, where the chat application includes a charting function according to some embodiments of the present invention. FIG. 15 depicts a communication 1501 generated and shared by the chat application of FIG. 14, which is displayed by an application running on a device of the second user 1402. According to some embodiments of the present invention the application includes functionality described in at least FIGS. 3-8, such that the application is an improved communications application.

As shown in the application 1400 of FIG. 14, two users are engaged in a communication in which the second user 1401 requests information from the first user 1401. The first user enters content 1403 into the user interface for the application and has the option of sending the content as entered by selecting a "send" button 1404 or with an automatically formatted presentation by selecting a "chart" button 1405. According to some embodiments, the application automatically formats content entered into the text box 1403. As shown in FIG. 15, the original content entered, see 1403, in the application is delivered to the second user's application, running on the second user's device, as a formatted presentation 1501 with, for example, improved formatting generated by recognizing a logical structure of the input content (see for example, FIGS. 3-8).

According to an embodiment of the present invention, the method of providing one or more design templates 301 further comprises creating, automatically, the graph restriction based on the display information of the text content, preparing the graph restriction with an object image, a size, and a position as external parameters, generating objects of the graph restriction using objects extracted from the display information of the text content, and determining numerical parameters for each of the objects of the graph restriction that match the display information of the text content.

According to some embodiments, explicit design template parameters can be extracted from metadata of the input content, by optical character recognition, etc. In one example, as illustrated in FIG. 16, a two-layer tree type a graph restriction can be created at 301, where object image, size, position, etc., are extracted from the input content and parameterized, see 1601. The parameterization can extract parameters from the input content for the "Top" and "Sub" object image, size, and position parameters (e.g., squares, circles, rounded-rectangles, etc.), including numerical parameters including, for example, Top.left (setting an indent for the Top object(s)), Top.xSize (setting a width of the Top object(s)), Top.Height (setting a buffer to an object below), Top.ySize (setting a height of the Top object(s)), Sub.xSize, etc. Additional design information is extracted from the input content, whereby formatting in the input content, e.g., the names for different nodes in the metadata, is matched to the nodes (e.g., "Top" and "Sub" nodes) in the graph restriction.

According to some embodiments, objects in the input content are associated with Top and Sub objects, respectively, by the object image parameters. That is, the different types of objects are displayed consistently in the output. According to some embodiments, parameters of the objects can be optimized so that presentation material produced using the template is an improvement on the input content. A generalized template is shown as 1601, using extracted parameters (including object image parameters and numerical parameters). According to at least one embodiment, the extract parameters are optimized by minimizing a sum of squares of differences of top/bottom/left/right boundaries in the rectangular area of all the objects between the input content and the output presentation. According to at least one embodiment, the number of linked nodes on the output presentation graph is used as a coefficient of parameter value (N) (e.g., Top.ySize=N×90).

Recapitulation:

According to an embodiment of the present invention, a computer-implemented method of operating a computer system for creation of a shaped presentation data comprises receiving text content comprising display information 601; extracting a plurality of text parts from the text content and the display information into (2-1); assigning first attributes to each of the text parts based on the display information and design similarities between the text parts (2-2); assigning second attributes to each of the text parts based on the display information and design similarities between the text parts (2-3); determining a plurality of groups of the text parts based on the first attributes and the second attributes (2-4); determining first links between the text parts of different ones of the groups using the display information, adjacency of the text parts in the text content, and adjacency of the groups in the text content 305; determining second links of the text parts to a plurality of object types defined by a graph restriction listing the object types and their parameters 306; and outputting a presentation by setting the text parts in the presentation corresponding to the parameters of their linked object type in the graph restriction 308, wherein the text parts of each of the groups are associated with a same one of the object types.

According to an embodiment of the present invention, the determination of the first links 305 between the text parts of different ones of the groups are based on one or more of the display information, adjacency of the text parts, and adjacency of the groups of text parts.

According to an embodiment of the present invention, the method includes providing a plurality of design templates 301 defining graph restrictions, including the graph restriction, and determining a correspondence between the text content and each of the design templates based on a number of the second links determined between the text parts and the object types defined by the graph restriction 306. According to an embodiment of the present invention, the method further comprises issuing an alert 1302 upon determining that the correspondence between the text content and any one of the design templates is less than a threshold. According to an embodiment of the present invention, the method further comprises issuing an alert 1302 upon determining that the correspondence between the text content and any one of the design templates is greater than a threshold.

According to an embodiment of the present invention, the method further comprises verifying the second links (2-4) using the first attributes and the second attributes.

According to an embodiment of the present invention, the method further comprises determining at least one item of the text content that is not logically parallel to other items in the text content (e.g., when one phrase is not in a logically parallel to the other phrases or text parts) and using the at least one item of the text content (2-4) to weigh against the determination of the plurality of groups of the text parts based on the first attributes and the second attributes.

According to an embodiment of the present invention, the graph restriction is configured to insert a page break into the presentation based on a known output object display area of a computing device (2-1). According to an embodiment of the present invention, the graph restriction is configured to insert a page break into the presentation based on a relevance of output information contents (2-1).

According to an embodiment of the present invention, the method further comprises creating, automatically, the graph restriction 301 based on the display information of the text content, preparing the graph restriction with an object image, a size, and a position as external parameters, generating objects of the graph restriction using objects extracted from the display information of the text content, and determining numerical parameters for each of the objects of the graph restriction that match the display information of the text content.

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system for organizing and servicing resources of the computer system. Further, a computer program product can include a tangible computer-readable recordable storage medium with code adapted to be executed to carry out one or more method steps described herein, including the provision of the system with the distinct software modules.

Figure 17:
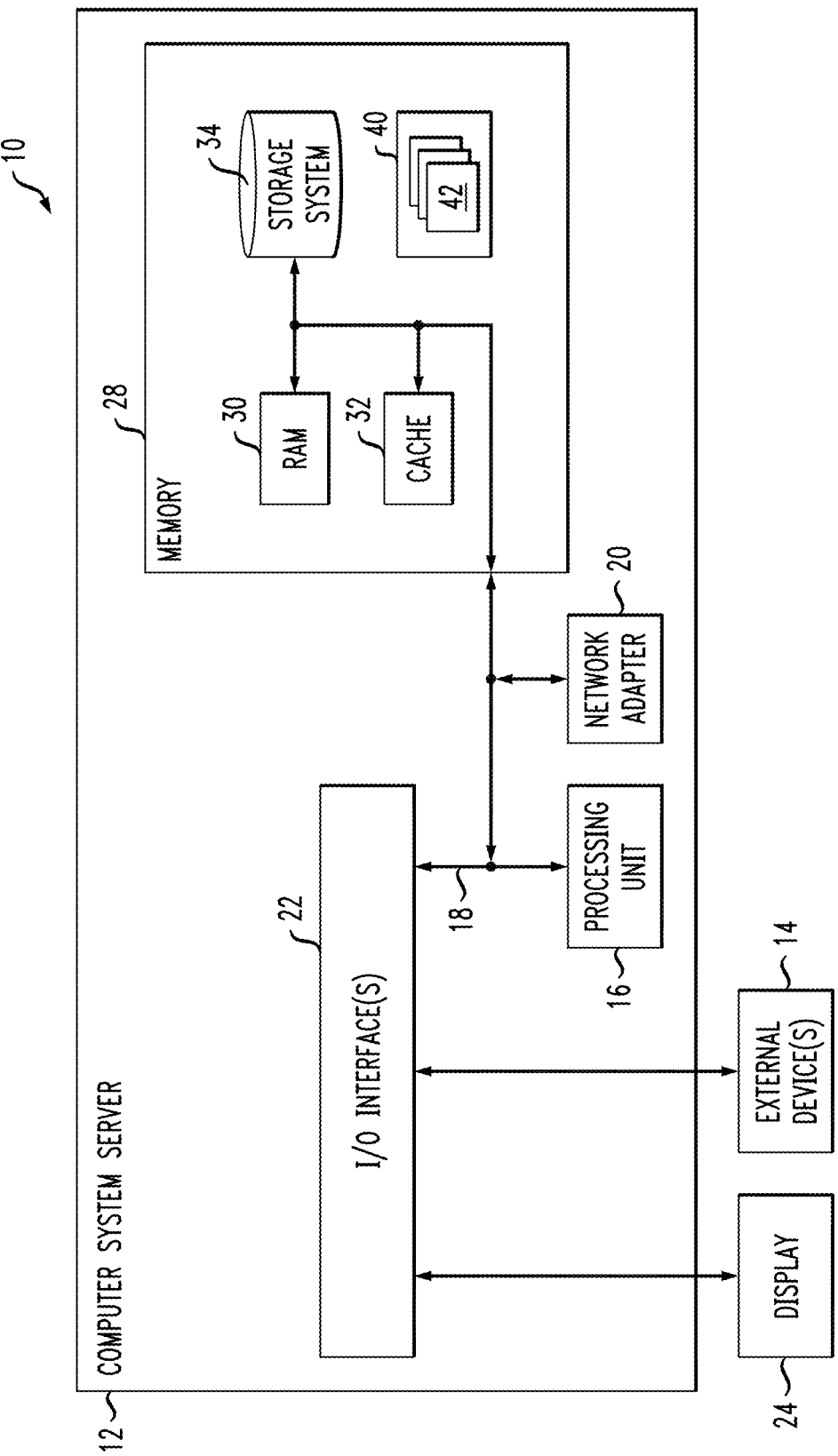
FIG. 17 depicts a computer system that may be useful in implementing one or more aspects and/or elements of the invention.

One or more embodiments of the invention, or elements thereof, can be implemented in the form of an apparatus including a memory and at least one processor that is coupled to the memory and operative to perform exemplary method steps. FIG. 17 depicts a computer system that may be useful in implementing one or more aspects and/or elements of the invention, also representative of a cloud computing node according to an embodiment of the present invention. Referring now to FIG. 17, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 17, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 17, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 17) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text. Consider, e.g., a database app in layer 66.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of operating a computer system for creation of shaped presentation data comprising:
    receiving text content comprising display information;
    extracting a plurality of text parts from the text content and the display information;
    assigning first attributes to each of the text parts based on the display information and design similarities between the text parts;
    assigning second attributes to each of the text parts based on a processing of the text content by word-embedding to extract contextual similarities between the text parts;
    determining a plurality of groups of the text parts based on the first attributes and the second attributes;
    determining first links between the text parts of different ones of the groups using the display information, adjacency of the text parts in the text content, and adjacency of the groups in the text content;
    determining second links of the text parts to a plurality of object types defined by a graph restriction listing the object types and their parameters; and
    outputting a presentation by setting the text parts in the presentation corresponding to the parameters of their linked object type in the graph restriction, wherein the text parts of each of the groups are associated with a same one of the object types.

2. The computer-implemented method of claim 1, wherein the determination of the first links between the text parts of different ones of the groups are based on one or more of the display information, adjacency of the text parts, and adjacency of the groups of text parts.

3. The computer-implemented method of claim 1, further comprising:
    providing a plurality of design templates defining graph restrictions, including the graph restriction; and
    determining a correspondence between the text content and each of the design templates based on a number of the second links determined between the text parts and the object types defined by the graph restriction.

4. The computer-implemented method of claim 3, further comprising issuing an alert upon determining that the correspondence between the text content and any one of the design templates is less than a threshold.

5. The computer-implemented method of claim 3, further comprising issuing an alert upon determining that the correspondence between the text content and any one of the design templates is greater than a threshold.

6. The computer-implemented method of claim 1, further comprising verifying the second links using the first attributes and the second attributes.

7. The computer-implemented method of claim 1, further comprising:
    determining at least one item of the text content that is not logically parallel to other items in the text content; and
    using the at least one item of the text content to weigh against the determination of the plurality of groups of the text parts based on the first attributes and the second attributes.

8. The computer-implemented method of claim 1, wherein the graph restriction is configured to insert a page break into the presentation based on a known output object display area of a computing device.

9. The computer-implemented method of claim 1, wherein the graph restriction is configured to insert a page break into the presentation based on a relevance of output information contents.

10. The computer-implemented method of claim 1, further comprising:
    creating, automatically, the graph restriction based on the display information of the text content;
    preparing the graph restriction with an object image, a size, and a position as external parameters;
    generating objects of the graph restriction using objects extracted from the display information of the text content; and
    determining numerical parameters for each of the objects of the graph restriction that match the display information of the text content.

11. A non-transitory computer readable storage medium comprising computer executable instructions which when executed by a computer cause the computer to perform a method for creation of shaped presentation data comprising:
    receiving text content comprising display information;
    extracting a plurality of text parts from the text content and the display information;
    assigning first attributes to each of the text parts based on the display information and design similarities between the text parts;

assigning second attributes to each of the text parts based on a processing of the text content by word-embedding to extract contextual similarities between the text parts;

determining a plurality of groups of the text parts based on the first attributes and the second attributes;

determining first links between the text parts of different ones of the groups using the display information, adjacency of the text parts in the text content, and adjacency of the groups in the text content;

determining second links of the text parts to a plurality of object types defined by a graph restriction listing the object types and their parameters; and outputting a presentation by setting the text parts in the presentation corresponding to the parameters of their linked object type in the graph restriction, wherein the text parts of each of the groups are associated with a same one of the object types.

12. The method of claim 11, wherein the determination of the first links between the text parts of different ones of the groups are based on one or more of the display information, adjacency of the text parts, and adjacency of the groups of text parts.

13. The method of claim 11, further comprising:
providing a plurality of design templates defining graph restrictions, including the graph restriction; and
determining a correspondence between the text content and each of the design templates based on a number of the second links determined between the text parts and the object types defined by the graph restriction.

14. The method of claim 13, further comprising issuing an alert upon determining that the correspondence between the text content and any one of the design templates is less than a threshold.

15. The method of claim 13, further comprising issuing an alert upon determining that the correspondence between the text content and any one of the design templates is greater than a threshold.

16. The method of claim 11, further comprising verifying the second links using the first attributes and the second attributes.

17. The method of claim 11, further comprising:
determining at least one item of the text content that is not logically parallel to other items in the text content; and
using the at least one item of the text content to weigh against the determination of the plurality of groups of the text parts based on the first attributes and the second attributes.

18. The method of claim 11, wherein the graph restriction is configured to insert a page break into the presentation based on a known output object display area of a computing device.

19. The method of claim 11, wherein the graph restriction is configured to insert a page break into the presentation based on a relevance of output information contents.

20. The method of claim 11, further comprising:
creating, automatically, the graph restriction based on the display information of the text content;
preparing the graph restriction with an object image, a size, and a position as external parameters;
generating objects of the graph restriction using objects extracted from the display information of the text content; and
determining numerical parameters for each of the objects of the graph restriction that match the display information of the text content.

* * * * *